(No Model.)
C. B. BEACH.
MANUFACTURE OF CAR WHEELS.
No. 329,617. Patented Nov. 3, 1885.
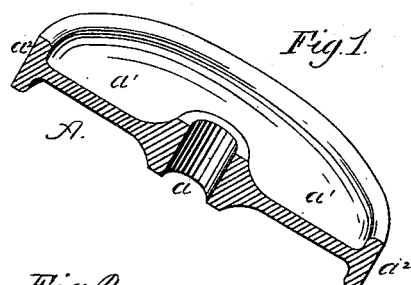
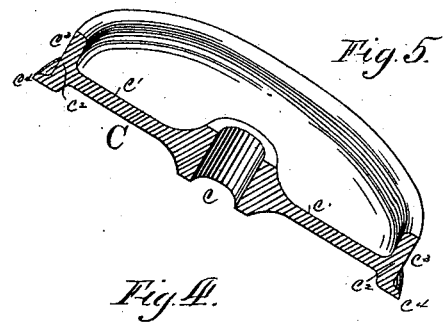
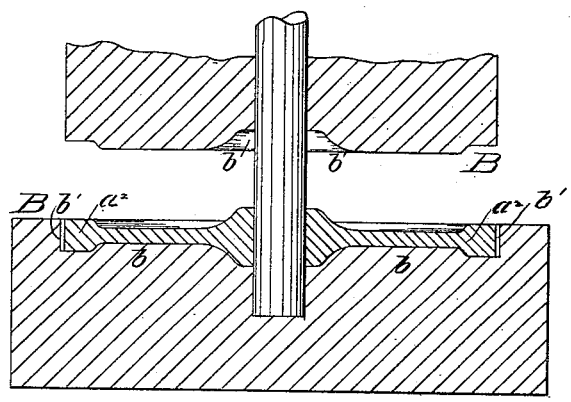
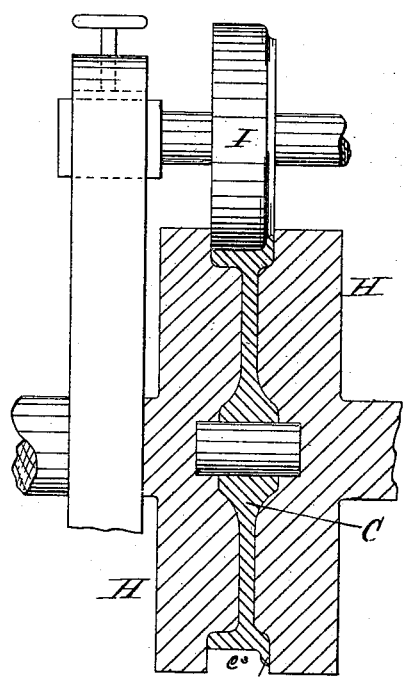
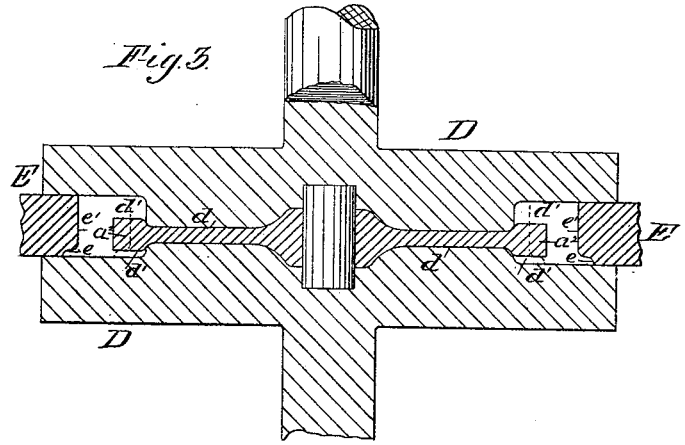
Witnesses:
C. Parker
A. H. Whittlesey
Inventor: Clifton B. Beach
By Attorney, George H. Christy

UNITED STATES PATENT OFFICE.

CLIFTON B. BEACH, OF CLEVELAND, OHIO.

MANUFACTURE OF CAR-WHEELS.

SPECIFICATION forming part of Letters Patent No. 329,617, dated November 3, 1885.

Application filed February 26, 1883. Serial No. 86,354. (No model.)

*To all whom it may concern:*

Be it known that I, CLIFTON B. BEACH, a citizen of the United States, residing at Cleveland, county of Cuyahoga, State of Ohio, have invented or discovered a new and useful Improvement in the Manufacture of Car-Wheels; and I do hereby declare the following to be a full, clear, concise, and exact description thereof, reference being had to the accompanying drawings, making a part of this specification, in which—like letters indicating like parts—

Figure 1 is a view in sectional perspective of a wheel-blank adapted for use in forming a cast-steel car-wheel by my improved process. Figs. 2, 3, and 4 are sectional views of dies, and a blank illustrative of different steps or operations forming part of my improved process; and Fig. 5 is a sectional perspective view of a car-wheel, also illustrative of my invention.

My invention relates to the art or process of forming a wrought periphery on a cast-steel car-wheel; and, in general terms, it consists in first forming a cast-metal blank having a plain-faced periphery of any desired size, with a web and hub approximately the size and form of the finished wheel; second, reducing the width of the rim by side hammering or compression below that of the rim of the finished wheel, and expanding it radially beyond the radial thickness of the wheel-rim; third, working the rim by hammering or rolling its periphery, thereby increasing its width, decreasing its radial thickness, and forming on its periphery a flange and tread surface of wrought metal, as hereinafter more fully described and claimed.

In the use of car-wheels the periphery (tread and flange) is the part which of all others sustains the greatest wear and strain, and should be by all practically-available means made tough and durable.

I consider it of importance, in order to secure the greatest attainable service from a cast-steel wheel, that the metal in the rim should be subjected to thorough and complete working by hammering or swaging, in order to give it the character and qualities of wrought metal; and to this end and for this purpose, during the process of forming the wheel I subject this part of it to mechanical reworking and manipulation by repeated reductions with freedom of expansion on different sides and in different directions, whereby the molecules of metal are removed over or upon each other, causing them to leave or to break up the crystalline structure characteristic of cast metal, and to assume new relationships of a fibrous nature, such as are characteristic of wrought metal. A familiar illustration of the effects thus produced is found in the treatment given by a blacksmith to a piece of cast-steel by hammering it upon his anvil, first on one side and then on the other, working the molecules of metal over and over to improve its quality. One important feature in such reworking of the metal is freedom for it to yield, draw, or expand in some direction under the compressing force applied. If steel is hammered or compressed when confined by unyielding walls, a highly-crystalline structure is imparted to it very detrimental to its use for car-wheels. On the other hand, if the molecules of metal are free to yield, moving over and upon each other to assume new relationships, such tendency to crystallize is not only avoided, but also the peculiar crystalline structure characteristic of fusion and casting is worked out or removed. This principle of steel-working forms an important feature of my invention, and is one characteristic distinguishing it from methods of working cast-steel wheels heretofore employed.

In carrying out my invention I cast a wheel-blank, A, of steel, having a hub, $a$, and web $a'$, conforming as nearly as may be found practicable in shape and size to the corresponding parts, $c\ c'$, of the finished car-wheel C, Fig. 5, to be made therefrom. I do not attempt, however, as others have done, in casting "wheel-blanks," so called, to give to the periphery or rim $a^2$ the form, or even approximately the form, of the finished car-wheel, but, on the contrary, it is made of the form of a plain-faced band—say like a belt-pulley—with sufficient body of metal therein to form the desired rim or tire of the car-wheel, allowing for waste in working; and while I do not wish to limit my invention by exact forms and sizes in this rim, I make it by preference a little greater in width of face and a little less in radial thickness than the corresponding parts of the finished wheel. By making the periphery-face of the rim plain I avoid, in a great measure, danger of blow-holes and injuries by unequal cooling and contraction, which are liable to occur when molten steel is run from a larger body into small recesses in the mold—such as would be required to form the comparatively thin flange of the wheel. These kinds of unsoundness, especially blow-holes, are very common in steel castings, and greater precautions are required to avoid them than in iron castings. Another and special reason for making a plain rim on the blank is to facilitate subsequent working of this part, and to provide for forming the tread and flange of the finished wheel of metal which has been subjected to thorough mechanical reworking. To this end the blank is heated, and its rim $a^2$ is subjected to side hammering or swaging, by which it is expanded radially beyond the extreme diameter of the finished wheel C, and is reduced to a thickness or width less than that of the finished wheel. I have shown dies B B, for effecting this side hammering or swaging, having recessed faces $b$ $b$, conforming to the desired shape of the blank after hammering. These dies may be supported and operated in any known or suitable manner, either as hammer-dies or as compression-dies, their force being exerted principally upon the rim, and by preference but little, if any, upon the faces of the web and hub, or, say, enough to close the pores of the metal, rendering it smooth and compact. The principal object is, however, to reduce the rim in one direction and expand it correspondingly in another, as a blacksmith does a piece of steel on his anvil. The periphery-wall $b'$ of the die-cavity is designed, principally, to prevent unequal expansion of the rim, caused by unequal heat at different points, thus preserving or securing a round form. It is not designed to confine the metal of the blank entirely around while being hammered, and therefore may, if desired, be omitted; but I prefer to retain it for the purpose stated. The amount and character of work which has thus been put upon the blank will sensibly toughen and strengthen it, and will tend directly to work out or eliminate the crystalline structure or arrangement of molecules peculiar to cast-steel; also, as a result of this step or operation, a wheel-blank is produced the diameter of which is measurably greater and the rim thinner than that of the finished car-wheel C. In the next step or operation performed on the blank it is reheated and the metal of the rim is reworked by hammering or by rolling, or by both, reducing it radially and expanding it in transverse width to the dimensions of the rim $c^2$ of the finished wheel, and at the same time the periphery is wrought into the desired form for tread $c^3$ and flange $c^4$ of the finished wheel. This operation may be performed by means of hammer-dies E and chucks D D, Fig. 3, the chucks being of greater diameter than the blank, and having clamping-faces $d$, conforming to the side faces of the hub and web, between which the blank is firmly held and prevented from warping and distortion while the hammers E work upon the periphery. Surrounding the web-faces of the chucks are recesses $d'$, which form a die-groove to receive and assist in shaping the rim. This groove being wider than the rim permits the metal to expand freely under the hammers, both laterally and into the hammer-grooves $e$, which are the counterparts in form of the flange $c^4$. The flat faces $e'$ of the hammers are designed to form the tread-surface $c^3$ of the wheel, and, with the grooved portions $e$, are by preference curved to fit the periphery of the wheel to be formed. A straight hammer-face may be employed, however, if desired, especially if rolls be employed to smooth the surface, as presently described.

The chucks D D and hammers E may be mounted and supported in any convenient way, and also provision be made for clamping the chucks and releasing them to permit the insertion and removal of the blank. Suitable means for effecting these purposes being well known in the art, I do not deem it necessary to show or describe the same in detail.

In operation the chucks and interposed blank are rotated either with a continuous or intermittent motion. If motion be continuous, the action of the hammers should be rapid.

By providing hammers on opposite sides and making their strokes simultaneous the chucks will be relieved in great measure from strain and shock. Any desired number of such hammers may be used, or rolls and hammers may be combined to work down the rim.

If desired, the rim of the wheel may be finished complete in this step or operation. I prefer, however, to make the final finish by light rolling in order to secure a smooth and true periphery and a practically-round wheel. This may be done either in the chucks D D, as above described, or in another set of similar chucks, H, Fig. 4, mounted and operated like the chucks D, with one or more finishing-rolls, I, designed to work out irregularities, but not to reduce the rim materially, the reduction being made in the chucks D, where open space is provided for free expansion of metal in the rim under the reducing force applied.

I make no claim herein to the mechanical means shown and described for working the metal of the rim. Neither do I wish to limit my invention to these or any other specific form of devices for carrying out the several steps or operations constituting my improved method, as different forms of dies, hammers, rolls, and other appliances suitable for these purposes are known in the art, and may be used instead of those shown.

It will be observed that in manipulating the metal a large amount of work is put upon it, and it is wrought throughout its entire body, the molecules of metal being moved over and upon each other into entirely different relationships from those sustained when cast. This being done without confining the metal so as to prevent free expansion, the crystalline structure of the metal will be worked out and its quality materially improved. In these respects my invention is a material and valuable improvement on methods of working cast-steel wheels heretofore employed, in which the sides and periphery of the wheel are subjected to compression at the same time, because such compression under confinement increases rather than decreases the crystalline structure of the metal, and in any event does not so work the metal by repeated reduction and expansion in different directions as to give it the wrought or fibrous character secured by my improved process.

The blank A may be cast in the first instance approximately to the form shown in Fig. 3, and its rim be worked by periphery hammering or rolling, or by both, into the base of the chuck-groove $d'$ to form a wrought tire integral with the cast metal of the web and hub, the step or operation illustrated in Fig. 2 being omitted; but such method of working is not claimed herein, as it forms in part the subject-matter of a separate application for patent, which was filed by me April 20, 1882, Serial No. 58,873, my present invention having reference more particularly to making repeated reductions or reworking the metal by repeated compression and expansion in different directions, whereby the original cast or crystalline structure of the metal is more thoroughly eliminated, and more of the characteristics of wrought and fibrous metal are secured.

I am aware that it is not new with myself to enlarge slightly in a radial direction the rim of a cast-steel car-wheel, when such enlargement is made against the working-face of an edge-bearing roll; but it is a characteristic feature of such operation that the metal of the rim is so enlarged only up to the peripheral plane of finish, whereas in the operation herein described the metal of the rim is worked out beyond the line of finish, and is then worked back. The former process involves merely a shaping operation, and the amount of working given to the metal is merely incidental and is too small to be appreciable. In my improved process the metal is worked preliminary to and independently of any final shaping. One is merely a finishing operation, while the other involves a previous working outside of and beyond the line of finish, followed by a finishing operation.

I claim herein as my invention—

As an improvement in the manufacture of solid cast-steel car-wheels, the method of operation hereinbefore described, which consists in enlarging the cast blank radially by swaging to a diameter greater than that of the finished wheel-tread, and working the periphery back to the desired circular line of finish, and simultaneously spreading the tread portion thereof and shaping the flange, substantially as set forth.

In testimony whereof I have hereunto set my hand.

CLIFTON B. BEACH.

Witnesses:
A. H. ATWATER,
WM. E. CUSHING.